(12) United States Patent
Reed et al.

(10) Patent No.: US 7,255,021 B2
(45) Date of Patent: Aug. 14, 2007

(54) APPARATUS FOR SELECTIVELY CONFIGURING A HYBRID ELECTRO-MECHANICAL VEHICULAR TRANSMISSION

(75) Inventors: William S. Reed, Greenfield, IN (US); Joel E. Mowatt, Zionsville, IN (US)

(73) Assignee: General Motors Corporation, Detroit, MI (US)

( * ) Notice: Subject to any disclaimer, the term of this patent is extended or adjusted under 35 U.S.C. 154(b) by 255 days.

(21) Appl. No.: 11/061,131

(22) Filed: Feb. 18, 2005

(65) Prior Publication Data
US 2005/0204862 A1 Sep. 22, 2005

Related U.S. Application Data

(60) Provisional application No. 60/555,141, filed on Mar. 22, 2004.

(51) Int. Cl.
*F16H 57/02* (2006.01)
*F16H 57/04* (2006.01)
*F16H 61/00* (2006.01)

(52) U.S. Cl. .................................. 74/606 R; 180/344
(58) Field of Classification Search ............. 74/606 R; 180/344, 374
See application file for complete search history.

(56) References Cited

U.S. PATENT DOCUMENTS

| | | | | |
|---|---|---|---|---|
| 4,641,547 | A | * | 2/1987 | Stich et al. ............... 74/606 R |
| 5,230,258 | A | * | 7/1993 | Nakano .................... 74/606 R |
| 5,287,770 | A | * | 2/1994 | Mudd ........................ 74/606 R |
| 5,311,787 | A | * | 5/1994 | Wilson et al. ............. 74/15.88 |

FOREIGN PATENT DOCUMENTS

JP 03284425 A * 12/1991
JP 10100702 A * 4/1998

* cited by examiner

*Primary Examiner*—Tisha Lewis

(57) ABSTRACT

A hybrid electro-mechanical vehicular transmission is provided that may be selectively configured to accommodate a two-wheel drive or a four-wheel drive vehicular configuration. This is accomplished using a two-wheel drive adapter housing affixed with respect to the transmission end housing.

7 Claims, 3 Drawing Sheets

APPARATUS FOR SELECTIVELY CONFIGURING A HYBRID ELECTRO-MECHANICAL VEHICULAR TRANSMISSION

CROSS-REFERENCE TO RELATED APPLICATIONS

This application claims the benefit of U.S. Provisional Application No. 60/555,141, filed Mar. 22, 2004, which is hereby incorporated by reference in its entirety.

TECHNICAL FIELD

The present invention relates to a hybrid electro-mechanical vehicular transmission selectively configurable between four-wheel drive and two-wheel drive configurations via a two-wheel drive adapter housing.

BACKGROUND OF THE INVENTION

Conventional non-hybrid vehicular transmissions typically house much of the mechanical components, such as clutches and planetary gear sets, within a transmission main housing. The end housing of the conventional non-hybrid vehicular transmission is usually a simple part that houses a minimal number of mechanical elements. As such, manufacturers typically design a new end housing that will mount directly to the transmission main housing for each of a two-wheel drive and a four-wheel drive variation.

Hybrid electro-mechanical vehicular transmissions may employ a dual motor system. Manufacturing requirements of the dual motor arrangement may require the splitting of the transmission main housing and the end housing farther forward on the transmission main housing than was previously required for the conventional non-hybrid vehicular transmission. This requires the end housing to contain more functional components than was previously necessary. These components may include clutches, planetary gear sets, and a park pawl system. In turn, this added functionality increases the complexity of the end housing. This added complexity makes individual end housings, one for each of a two-wheel drive and a four-wheel drive variation, more expensive to design and manufacture.

SUMMARY OF THE INVENTION

The present invention provides an improved hybrid electro-mechanical vehicular transmission that may be selectively configured to accommodate a two-wheel drive or a four-wheel drive vehicular configuration. This is accomplished using a two-wheel drive adapter housing affixed with respect to the end housing.

By providing a two-wheel drive adapter housing to refit a four-wheel drive configured transmission, the piece cost of designing and manufacturing the end housing for a hybrid electro-mechanical vehicular transmission may be reduced.

Accordingly, the present invention provides a selectively configurable hybrid electro-mechanical vehicular transmission having a transmission main housing operable to contain at least one motor/generator assembly. Attached to the transmission main housing is an end housing configured for four-wheel drive transfer case attachment. Also provided is an adapter housing attachable to the end housing and operable to configure the end housing to accommodate a two-wheel drive vehicular configuration in lieu of the four-wheel drive transfer case attachment.

The adapter housing may be formed from an alloy of aluminum by a forming technique such as die-casting. The adapter housing may include a seal operable to prevent fluid leaks from the transmission or debris from entering the transmission. The adapter housing may further include a bushing for journaling purposes. The adapter housing may be attached to the end housing by mechanical attachment. This mechanical attachment may be accomplished by the use of a plurality of bolts.

A gasket element, operable to prevent leakage of transmission fluid, may be disposed between the adapter housing and the end housing. The adapter housing may further include a plurality of gussets disposed radially with respect to the adapter housing and operable to increase the structural rigidity of the adapter housing.

The above features and advantages and other features and advantages of the present invention are readily apparent from the following detailed description of the best modes for carrying out the invention when taken in connection with the accompanying drawings.

DESCRIPTION OF THE PREFERRED EMBODIMENTS

Figure 1:
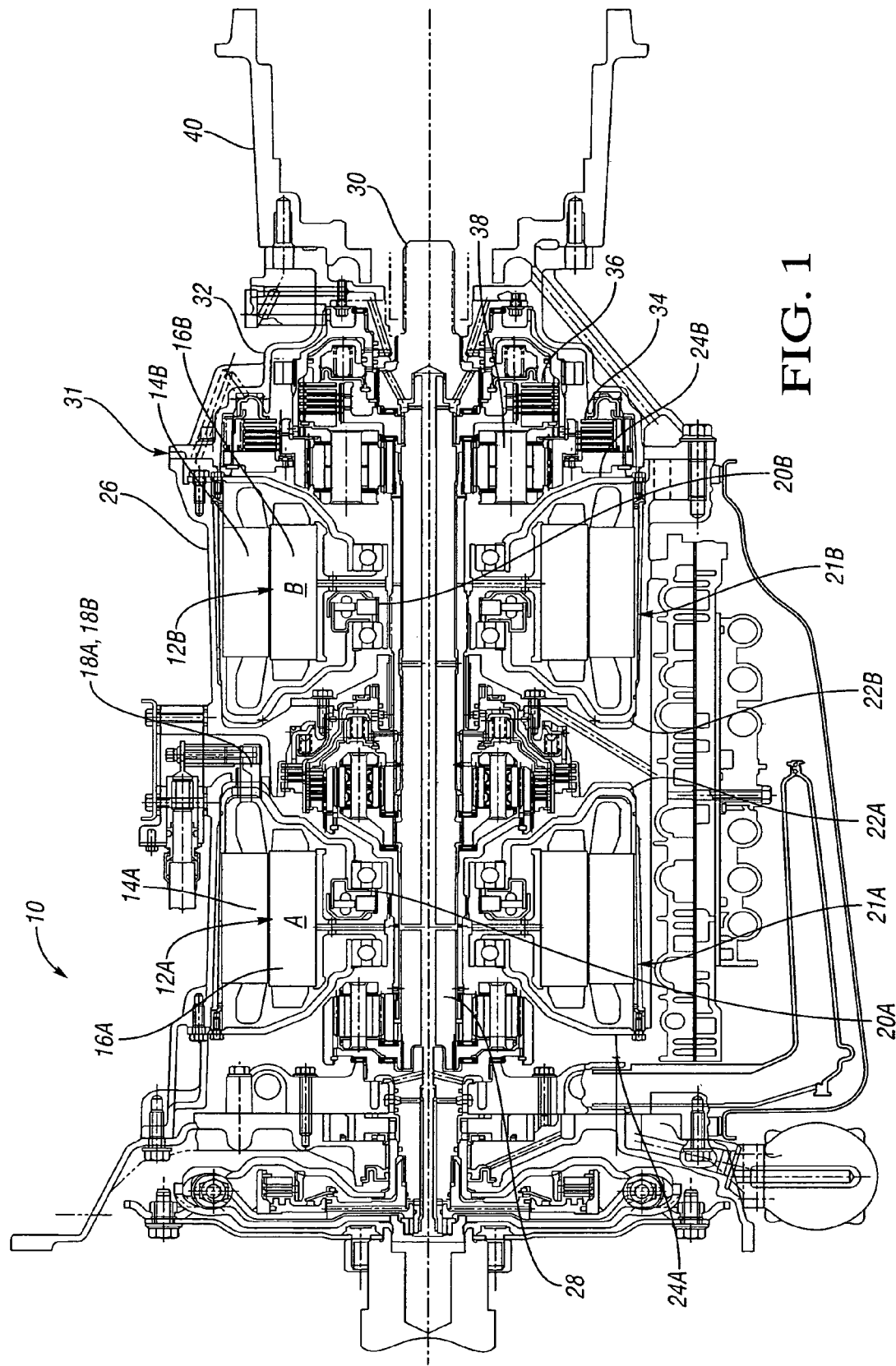
FIG. 1 is a schematic cross-sectional view of a hybrid electro-mechanical vehicular transmission having a four-wheel drive transfer case attached thereto.
Figure 2:
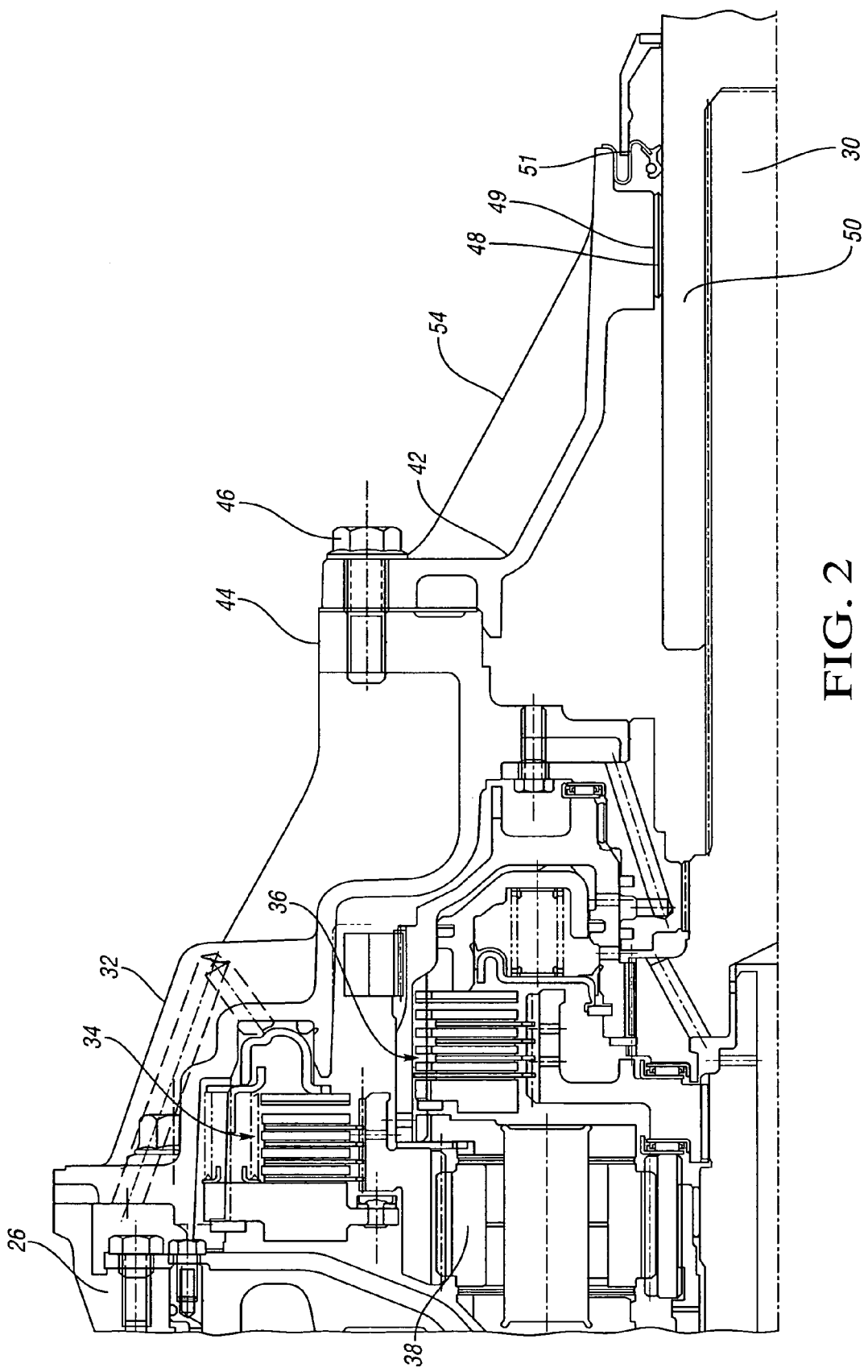
FIG. 2 is a schematic fragmentary cross-sectional view of a portion of the transmission main housing, end housing, and two-wheel drive adapter housing illustrating the functional elements of the present invention.
Figure 3:
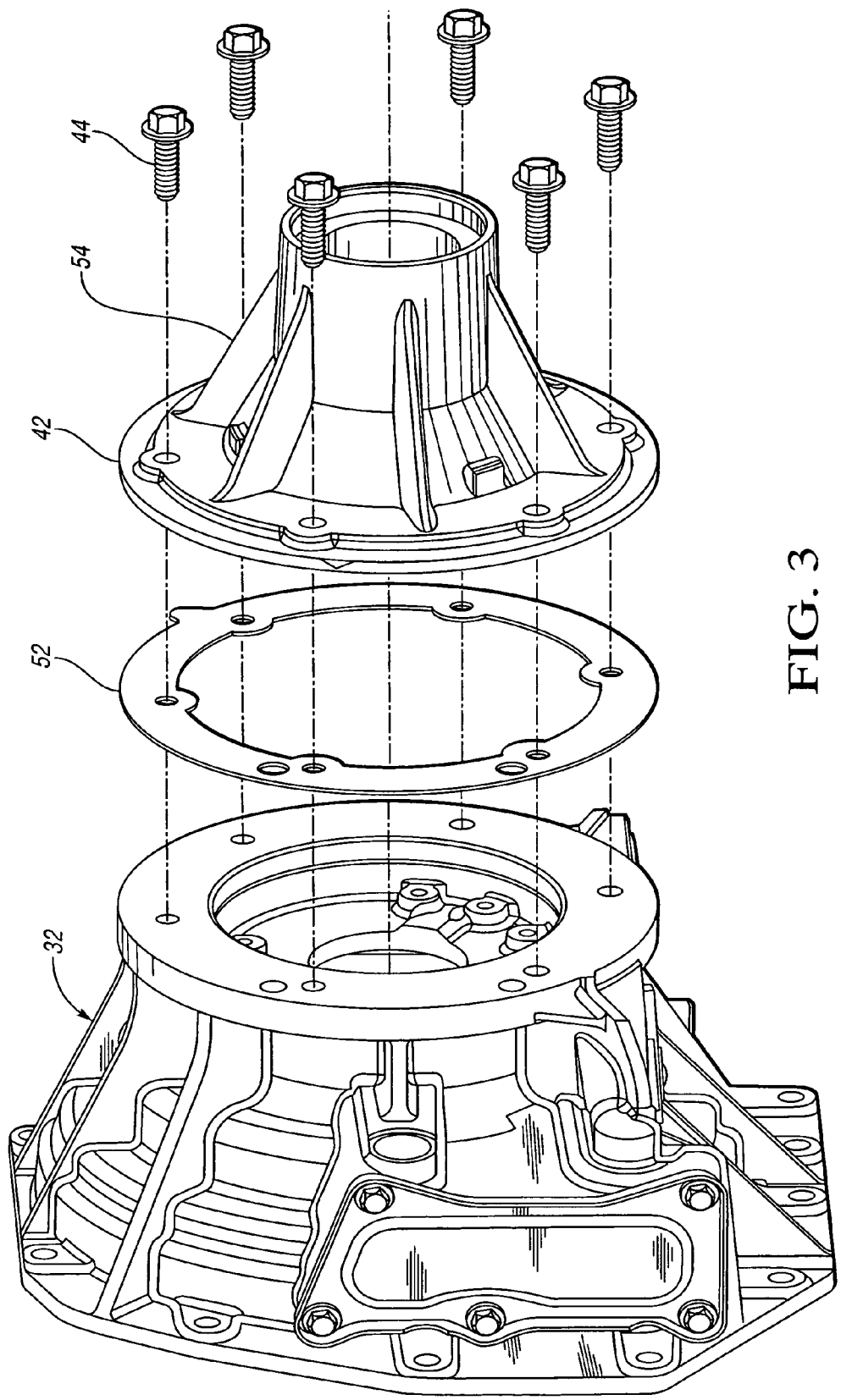
FIG. 3 is an exploded perspective side view of a transmission end housing and two-wheel drive adapter housing consistent with the present invention.

Referring to FIGS. 1 through 3, wherein like characters represent the same or corresponding parts throughout the several views, there is shown in FIG. 1 a schematic fragmentary cross-sectional view of a hybrid electro-mechanical vehicular transmission 10 having a first motor/generator module A, and a second motor/generator module B. The motor/generator modules A and B may be operated in various modes to accelerate and drive the vehicle, start the engine, brake the vehicle, and charge the batteries (not shown).

Each of the motor/generator modules A and B include a motor/generator 12A and 12B respectively, each have a stator 14A and 14B circumscribing a rotor 16A and 16B. The motor/generator modules A and B also include motor/generator power connections 18A and 18B and motor/generator position and speed sensors 20A and 20B. A drum 21A and 21B, having a module housing 22A and 22B and a module cover 24A and 24B, is operable to contain the stator 14A and 14B, rotor 16A and 16B, motor/generator power connection 18A and 18B, and the motor/generator position and speed sensor 20A and 20B for each of the first motor/generator module A and the second motor/generator module B. In the preferred embodiment, the module housing 22A and 22B will be flow formed. The module cover 24A and 24B cooperates with the module housing 22A and 22B to contain the elements therein and to mount the drum 21A and 21B within the transmission main housing 26. In the preferred embodiment, the module cover 24A and 24B will be stamped from metal sheet stock.

The motor/generator modules A and B operate to selectively rotate the main shaft 28 at variable speeds, which in turn may selectively rotate the output shaft 30. The motor/generator module B is inserted into the transmission main housing 26 through the opening present at interface 31 prior to the attachment of end housing 32. The requirement that the motor/generator module B be installed in such a position within the hybrid electro-mechanical vehicular transmission 10 requires many of the components that would normally be housed within the transmission main housing 26 to be housed elsewhere, and in the case of this invention to be contained within the end housing 32. These components may include first clutch 34, second clutch 36, third planetary gear set 38, and a park pawl mechanism (not shown). Four-wheel drive applications will have a transfer case 40 mounted directly to the end housing 32.

Shown in FIG. 2 is a schematic fragmentary cross-sectional view of a portion of the transmission main housing 26, end housing 32, and two-wheel drive adapter housing 42 illustrating the functional elements of the present invention. The two-wheel drive adapter housing 42 attaches to a four-wheel drive transfer case mounting feature 44 of the end housing 32. The attachment may be accomplished by mechanical attachment such as clamping or riveting, however, in the preferred embodiment the two-wheel drive adapter housing 42 will attach to the end housing 32 by a plurality of bolts 46. The bushing 48 is disposed within a bore 49 defined by the adapter housing 42 and is operable to journal the driven shaft 50 into alignment with the output shaft 30. A seal 51 is mounted with respect to one end of the adapter housing 42 and is in frictional engagement with the driven shaft 50. The seal 51 operates to block debris from entering, and transmission fluid from leaving the adapter housing 32.

FIG. 3 is an exploded perspective side view of a transmission end housing 32 and two-wheel drive adapter housing 42 consistent with the present invention. A gasket 52 may be placed between the end housing 32 and the adapter housing 42. The gasket 52 may be made of rubber, paper, or other known gasket materials such as cork. The gasket 52 will prevent transmission fluid leaks from the interface between the end housing 32 and the adapter housing 42. Those skilled on the art of sealing may recognize that the gasket 52 may be eliminated with the use of sealants such as room temperature vulcanizing (RTV) silicone sealant. Preferably, the adapter housing 42 will be made from aluminum or an alloy of aluminum, however, the adapter housing 42 may also be made from any material that can provide the requisite structural rigidity such as iron or magnesium.

The adapter housing 42 may be formed by a variety of processes such as milling, sand casting, or lost foam casting. In the preferred embodiment, the adapter housing 42 is manufactured by die-casting. Generally, die-casting is compatible with the use of aluminum alloys. Additionally, die-casting provides excellent dimensional accuracy and stability when used in high volume manufacturing. Preferably, a plurality of gussets 54 are disposed radially about the adapter housing 42 and are operable to increase the structural rigidity of the adapter housing 42.

By providing an improved hybrid electro-mechanical vehicular transmission that may be selectively configured to accommodate a two-wheel drive or a four-wheel drive vehicular configuration accomplished through the use of a two-wheel drive adapter housing affixed with respect to the end housing, the piece cost of designing and manufacturing the end housing for a hybrid electro-mechanical vehicular transmission may be reduced.

The present invention also provides a method of adapting a hybrid electro-mechanical vehicular transmission 10, which is configured for a four-wheel drive application, to a two-wheel drive application. The method entails configuring the hybrid electro-mechanical vehicular transmission 10 with a main housing 26. Subsequently attaching an end housing 32 configured for a four-wheel drive transfer case 40 to the main housing 26. Next, a two-wheel drive adapter housing 42 is configured for attachment to the end housing 32. Finally, the two-wheel drive adapter housing 42 is attached to the end housing 32 for a two-wheel drive vehicle application in lieu of a four-wheel drive vehicle application.

While the best modes for carrying out the invention have been described in detail, those familiar with the art to which this invention relates will recognize various alternative designs and embodiments for practicing the invention within the scope of the appended claims.

The invention claimed is:

1. A selectively configurable hybrid electro-mechanical vehicular transmission comprising:
   a transmission main housing operable to contain at least one motor/generator assembly;
   an output shaft;
   an end housing configured for four-wheel drive transfer case attachment, said end housing being attachable to said main housing;
   an adapter housing attachable to said end housing and operable to configure said end housing to accommodate a two wheel drive vehicular configuration in lieu of said four-wheel drive transfer case attachment;
   said adapter housing having a bushing operable to pilot a driven shaft onto said output shaft; and
   said adapter housing having a seal in frictional communication with said driven shaft and operable to both prevent debris from entering said selectively configurable hybrid electro-mechanical vehicular transmission, and to prevent transmission fluid from exiting said selectively configurable hybrid electro-mechanical vehicular transmission.

2. The selectively configurable hybrid electro-mechanical vehicular transmission of claim 1, wherein said adapter housing is formed from an alloy of aluminum by a forming technique.

3. The selectively configurable hybrid electro-mechanical vehicular transmission of claim 1, wherein said adapter housing is attached to said end housing by mechanical attachment.

4. The selectively configurable hybrid electro-mechanical vehicular transmission of claim 3, wherein said mechanical attachment is effected by a plurality of bolts.

5. The selectively configurable hybrid electro-mechanical vehicular transmission of claim 2, wherein said forming technique is die-casting.

6. The selectively configurable hybrid electro-mechanical vehicular transmission of claim 1, further comprising a gasket element, said gasket element being disposed between said adapter housing and said end housing, said gasket element being operable to prevent leakage of transmission fluid.

7. The selectively configurable hybrid electro-mechanical vehicular transmission of claim 1, wherein a plurality of gussets is disposed radially with respect to said adapter housing.

* * * * *